Patented Apr. 19, 1927.

1,625,283

UNITED STATES PATENT OFFICE.

KURT RIPPER, OF VIENNA, AUSTRIA, ASSIGNOR TO FRITZ POLLAK, OF VIENNA, AUSTRIA.

PROCESS FOR MANUFACTURING HOMOGENEOUS GLASSLIKE CONDENSATION PRODUCTS OF UREA AND FORMALDEHYDE.

No Drawing. Application filed September 9, 1922, Serial No. 587,222, and in Austria May 31, 1921.

The invention relates to the manufacture of condensation products obtained by the reaction of formaldehyde on a urea.

The condensation products initially yielded by the reaction between these substances are soluble in water, but when treated by heat, are gelatinized after a period of time into intermediate products considerably less soluble in water, and finally into products wholly insoluble therein.

Now I have found that the gelatinization of the initial condensation products soluble in water may be accelerated by the addition of water soluble non alkaline compounds having a high degree of electrolytic dissociation. Such salts accelerating the gelatinization may be divided into two groups, the one of which has the property of converting the initial condensation products soluble in water into a fully hard and insoluble state within a few hours, while the majority of accelerating salts does not produce the said result, but only gelatinize the material much quicker than gelatinization would take place without an addition of salts.

To the salts causing the material to harden to the full extent when working in the cold, belong especially ammonium salts, both of strong and of weak acids. A very quick acting reaction accelerator is for instance ammonium sulphocyanate, but other ammonium salts such as ammonium sulphate, ammonium chloride and the like may be used for the same purpose. The physical and chemical properties as well as the appearance of the hard and insoluble products obtained thereby, vary to a certain extent according to the nature of the salts resorted to. When produced in the form of thin films (to allow the water present therein to evaporate easily) these products are as clear as glass and entirely transparent.

To the second class mentioned above belong especially the salts of strong acids, for instance of inorganic acids, such as sulphates, chlorates, chlorides, nitrates and the like. With the exception of ammonium salts their action and its variations is exclusively due to the anion.

By allowing the mixture of the initial condensation product and of the added salt to stand at ordinary room temperature the final state of hardness and insolubility is reached within a shorter or longer period of time according to the nature of the accelerating agent. Water, separating during this hardening, has to be removed. If a thick moulded article is hardened in the cold by means of a quick-acting accelerating agent, clouding and cracks may easily occur. This is due to the fact that the water still present in the material clouds the latter owing to the quick hardening, the said water producing cracks when escaping from the article lying in contact with the air. It is therefore advisable to build up the moulded object in a plurality of layers, allowing one layer or coating to be dried in the air before the next is put on, for the purpose of eliminating the water contained therein.

As example of desirable proportions of the ingredients the following may be mentioned:

60 parts by weight of urea, 150 parts by weight of 40% solution of formaldehyde (40% by volume) and 6 parts by weight of hexamethylenetetramine are heated under reflux in a water bath until test samples do not become cloudy when cooling down. Gelatinization sets in after a short time, if one part of potassium sulphate (or potassium nitrate or potassium chloride or potassium chlorate or potassium iodide or potassium sulphocyanate etc.) is added to 100 parts of the condensation product thus obtained. The gelatinous mass being allowed to stand in the cold, water begins to separate therefrom. The material may now be hardened by letting it stand in the cold, care being taken, that the water is eliminated.

This method is particularly suitable for obtaining products of striking beauty and transparency.

The material obtained is well suited for being worked mechanically in any manner (on the lathe, sawed, bored, filed, polished or stamped).

I wish it to be understood that I do not desire to be limited to the exact details described, for obvious modifications will occur to a person skilled in the art.

The expression "strong acids" as employed in the appended claims, is intended to refer to the acids from which the salts above referred to are derived, such as sulphuric acid, hydrochloric acid, sulphocyanic acid (also frequently called thiocyanic acid), chloric acid, nitric acid and the like.

I claim:

1. The process for manufacturing homogeneous glasslike masses by condensation of formaldehyde with a urea which consists in accelerating the gelatinization of the water soluble initial condensation by the addition of water soluble non alkaline compounds having a high degree of electrolytic dissociation, the amount of these compounds being much smaller than that of the initial condensation product to be treated.

2. The process for manufacturing homogeneous glasslike masses by the condensation of formaldehyde with a urea which consists in accelerating the gelatinization of the water soluble initial condensation products by the addition of a much smaller amount of water soluble salts of strong acids.

3. The process for manufacturing homogeneous glasslike products by condensation of formaldehyde with a urea which consists in accelerating the gelatinization of the water soluble initial condensation products by the addition of a much smaller amount of water soluble salts of strong inorganic acids.

4. The process for manufacturing homogeneous glasslike masses by condensation of formaldehyde with a urea which consists in accelerating the gelatinization of the water soluble initial condensation products by the addition of a much smaller amount of water soluble non alkaline compounds having a high degree of electrolytic dissociation and allowing the material to stand at ordinary temperature to reach the final state of hardness and insolubility.

5. The process for manufacturing homogeneous glasslike masses by condensation of formaldehyde with a urea which consists in accelerating the gelatinization of the water soluble initial condensation products by the addition of a much smaller amount of water soluble non alkaline compounds having a high degree of electrolytic dissociation and allowing the meterial to stand at ordinary temperature to reach the final state of hardness and insolubility, while eliminating the water.

In testimony whereof I have affixed my signature.

KURT RIPPER.